UNITED STATES PATENT OFFICE.

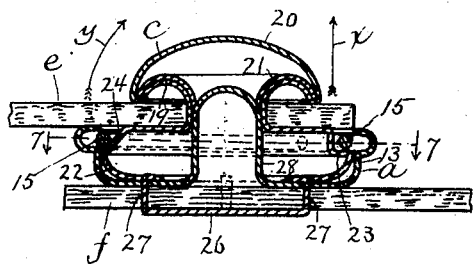
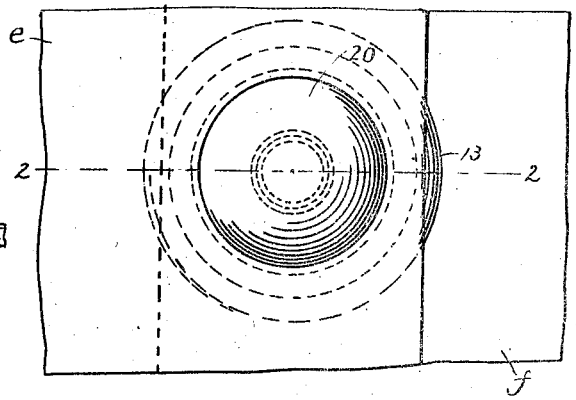
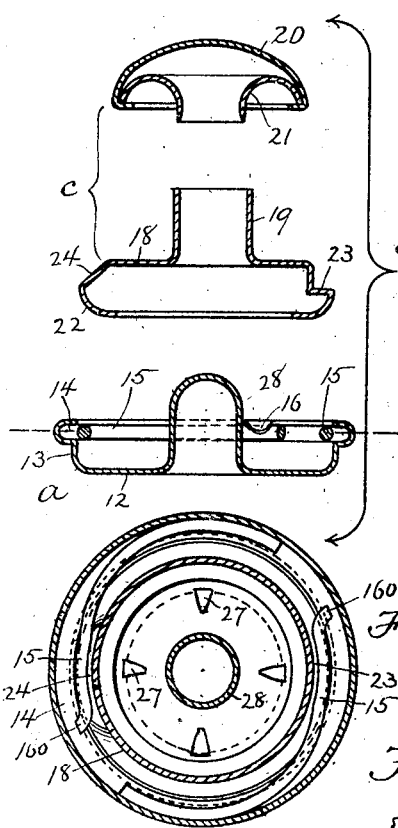
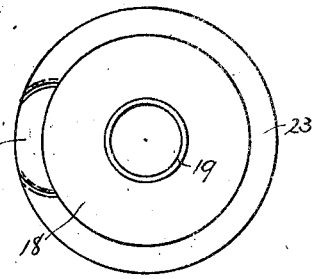
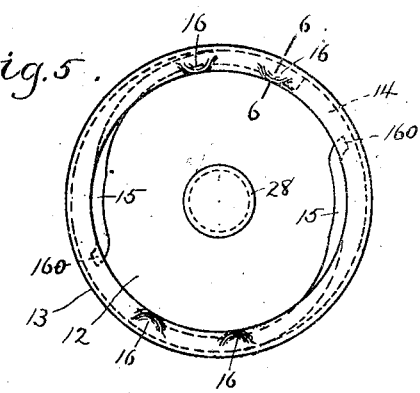
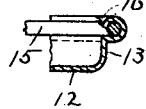

FRED S. CARR, OF BROOKLINE, MASSACHUSETTS, ASSIGNOR TO CARR FASTENER COMPANY, OF BOSTON, MASSACHUSETTS, A CORPORATION OF MAINE.

FASTENING DEVICE.

942,542.  Specification of Letters Patent.  Patented Dec. 7, 1909.

Application filed January 10, 1908. Serial No. 410,124.

*To all whom it may concern:*

Be it known that I, FRED S. CARR, of Brookline, in the county of Norfolk and State of Massachusetts, have invented certain new and useful Improvements in Fastening Devices, of which the following is a specification.

This invention relates to a fastening device adapted to detachably connect two parts or pieces, such as parts of a glove or a garment, or such as a carriage curtain and the part of the frame of a carriage top with which the curtain is connected, the fastener to which my invention relates comprising a socket member attached to one part, and a stud member attached to the other part, and adapted to enter the socket member.

The invention has for its object to provide a socket and stud fastening member of such construction that when the members are interengaged, the stud member will be positively locked to the socket member against a direct outward pull, or in other words, against pressure tending to move the stud member in a rectilinear direction from the socket member, and is capable of being separated from the socket member only by a tipping movement in one direction, or, in other words, by pressure exerted in a direction oblique to the direction of pressure which tends to separate the stud member from the socket member.

My invention is embodied in a stud and socket fastening device, the members of which are interlocked by the insertion of the stud into the socket, and are held positively engaged against rectilinear pressure on one member tending to separate it from the other member, and are adapted to be disconnected by pressure exerted obliquely, or, in other words, by a tipping movement of one of the members relatively to the other.

Of the accompanying drawings, forming a part of this specification,—Figure 1 represents a top plan view of a fastener embodying my invention, and portions of the two parts connected thereby. Fig. 2 represents a section on line 2—2 of Fig. 1. Fig. 3 represents in separate views the several parts of the fastener disconnected. Fig. 4 represents a plan view of one of the parts of the stud member. Fig. 5 represents a plan view of the socket member. Fig. 6 represents a section on line 6—6 of Fig. 5. Fig. 7 represents a section on line 7—7 of Fig. 2.

The same characters of reference indicate the same parts in all the figures.

The socket member *a* of my improved fastener is preferably circular, and made of sheet metal in the form of a shallow cup having a bottom portion 12, and a flange or wall 13 which is offset to form an annular inwardly-opening groove or channel 14.

15 15 represent resilient wire jaws, each of which is fixedly secured in the groove 14, preferably by pressing portions 16 of the outer wall of said groove downwardly upon one end portion of the wire, the opposite end portion of each wire jaw being free, and normally projecting into the stud-receiving space surrounded by the flange 13. The extreme outer end of each jaw is bent outwardly, as shown at 160, so that the outer side of the groove 14 overhangs it, the jaws being thus prevented from escaping from its plane of operation.

*c* represents the stud member of the fastening device, this member being here shown as composed of two general parts; viz., a head 18 formed to enter the socket *a*, said head being made of sheet metal, and provided with a tubular shank 19 and a sheet metal cap 20 having a tubular flaring bottom piece 21 adapted to enter the shank 19, the under face of the bottom piece 21 serving as an anvil to spread and upset the upper portion of the shank 19 when the two parts of the stud member are pressed together, as shown in Fig. 2. The head 18 is provided on its outer side with a convex marginal portion 22, which is adapted, when the stud member is being inserted in the socket member, to force the jaws 15 outwardly until the stud member has fully entered the socket member, the head 18 having two shoulders 23 and 24 which engage the jaws 15, as shown in Fig. 2, when the stud member is in place in the socket member. The shoulder 23 is flat, and is in a plane substantially parallel with the bottom of the socket member, and at right angles with the direction of movement of the stud member when the latter is moving outwardly from the socket member, as indicated by the arrow *x* in Fig. 2, the form and arrangement of the shoulder 23 being such that when force is applied to the stud member tending to move it in the direction indicated by the arrow *x*, the shoulder will be positively locked against such movement by the corresponding jaw 15.

The shoulder 24 is inclined or oblique, as shown in Figs. 2 and 3, the arrangement being such that when the shoulder is pressed outwardly against the corresponding jaw 15, it is adapted to displace said jaw, and pass by the latter.

It will be seen by reference to Fig. 2 that when the stud member is engaged with the socket member, any pressure exerted on the part $e$ to which the stud member is attached, tending to separate it from the part $f$, to which the socket member is attached, will be prevented by the engagement of the shoulder 23 with the corresponding jaw 15, so long as the pressure is exerted in a rectilinear outward direction, indicated by the arrow $x$. When, however, pressure is exerted obliquely, as indicated by the arrow $y$, and in such manner as to tip the socket member, and raise the side thereof on which the oblique shoulder 24 is formed, said shoulder will displace the corresponding jaw 15, and the shoulder 23 will be withdrawn from under the other jaw 15 by the tipping motion of the stud member. Provision is therefore made for readily disengaging the two parts by special manipulation or pressure, which, however, is in a different direction from that exerted on the stud member by the ordinary conditions of use. For example, when the fastening device is applied to a glove, the natural strain or pressure tending to separate the members is in the direction of the arrow $x$, this pressure being resisted by the positive engagement of shoulder 23 with the accompanying jaw 15, aided by the friction of shoulder 24 with the other jaw 15. It is impossible to separate the members, except by tipping one member relatively to the other in the direction indicated by the arrow $y$, this tipping motion being one which is not likely to be caused accidentally.

The socket member may be attached to the part $f$ by means of a clamping plate 26 having prongs 27 which pass through the part $f$, and are clenched upon the bottom of the socket member. The stud member may be secured to the part $e$ by inserting the shank 19 in an orifice formed for its reception in said part, and then applying the cap 20, and exerting pressure on the two parts of the stud member in opposite directions until they are interlocked, as shown in Fig. 2.

The opening formed by the tubular shank 19 constitutes a pocket adapted to receive the outer end portion of a post 28 formed on the socket member. The said post and pocket constitute means for centering the stud member relatively to the socket member, their arrangement being such that they permit the described tipping motion of the stud member.

My invention is not limited to the details of construction here shown, and the same may be variously modified, within the limits of mechanical skill.

I claim:

A fastener composed of a socket member having a center post and also having a marginal inwardly opening groove and resilient jaws secured to the socket member in said groove, and projecting inwardly from the latter, and a stud member formed to enter the socket member, and having a center pocket to receive said post and also provided with a flat shoulder adapted to be positively interlocked with one of the jaws, and an inclined shoulder adapted to exert a displacing pressure on the other jaw.

In testimony whereof I have affixed my signature, in presence of two witnesses.

FRED S. CARR.

Witnesses:
C. F. BROWN,
P. W. PEZZETTI.